United States Patent [19]
Mizukoshi

[11] Patent Number: 6,005,787
[45] Date of Patent: Dec. 21, 1999

[54] MULTILEVEL POWER CONVERTER INCLUDING SWITCHING CIRCUITS

[75] Inventor: Masahito Mizukoshi, Nagoya, Japan

[73] Assignee: Denso Corporation, Kariya, Japan

[21] Appl. No.: 09/199,316

[22] Filed: Nov. 25, 1998

[30] Foreign Application Priority Data

Nov. 25, 1997 [JP] Japan ................................. 9-323498
Sep. 18, 1998 [JP] Japan ................................. 10-265019

[51] Int. Cl.$^6$ .................................................. H02M 7/00
[52] U.S. Cl. ............................................. 363/71; 307/44
[58] Field of Search ..................... 363/71, 142; 327/403, 327/404, 408; 307/44

[56] References Cited

U.S. PATENT DOCUMENTS 4,079,445  3/1978  Hufnagel ................................... 363/71
5,517,401  5/1996  Kinoshita et al. ....................... 363/132

FOREIGN PATENT DOCUMENTS 5-308778  11/1993  Japan .

*Primary Examiner*—Shawn Riley
*Attorney, Agent, or Firm*—Pillsbury Madison & Sutro LLP

[57] ABSTRACT

A multi-level power converter such as an inverter for changing one of a plurality of dc voltage inputs into an ac voltage output is provided which includes inverter arms disposed between dc power supplies and an ac voltage output terminal. The inverter arms include switching circuits which are selectively subjected to PWM control to establish and block communication between one of the corresponding dc power supplies and the ac voltage output terminal. The switching circuits that are not connected to either the maximum or minimum dc voltage terminal include a first switching device, a second switching device connected in series with the first switching device, a first diode connected backward in parallel to the first switching device, and a second diode connected backward in parallel to the second switching device. This structure decreases the number of floating power supplies for driving the switching elements.

6 Claims, 9 Drawing Sheets

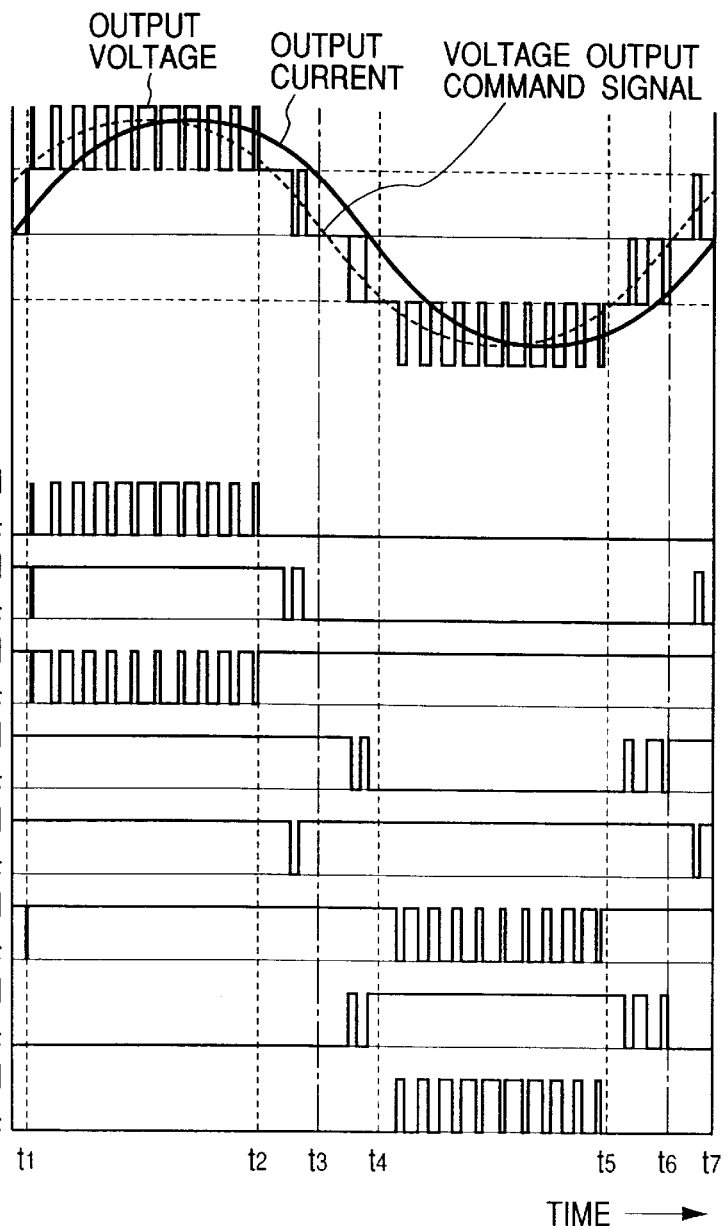

FRIOR ART

MULTILEVEL POWER CONVERTER INCLUDING SWITCHING CIRCUITS

BACKGROUND OF THE INVENTION

1. Technical Field of the Invention

The present invention relates generally to a multi-level power converter designed to change one of a plurality of dc voltage inputs into an ac voltage output.

2. Background of Related Art

Japanese Patent First Publication No. 5-308778 discloses a conventional multi-level inverter.

FIG. 8 shows a circuit (e.g., a U-phase circuit) in one of three phases (U-phase, V-phase, and W-phase) of a conventional four-level inverter designed to provide a three-phase ac voltage. The circuit includes dc power supplies 101 to 104 that have dc voltages of different levels at dc voltage terminals 101a to 105a. Between the dc voltage terminals 101a to 105a and an U-phase output terminal 106, U-phase inverter arms are disposed, respectively, which include switching devices 111a to 118a such as MOS transistors connected in series, flywheel diodes 111b to 118b connected backward in parallel to the switching elements 111a to 118a, and diodes 121 to 125 connected to dc voltage dividing points, respectively. The output ac voltage from the output terminal 106 is achieved by subjecting the switching elements 111a to 118a selectively to PWM (Pulse Width Modulation) control.

V- and W-phase circuits are connected to the same dc power supplies 101 to 104 as used in the above described U-phase circuit and include the same inverter arms as those of the U-phase circuit, respectively. The output terminals of the U-, V-, and W-phase circuits provide a three-phase ac voltage to an electric load such as a three-phase ac motor.

FIG. 9 shows a drive circuit for applying the voltage across a gate and a source of each of the switching elements 111a to 118a. The drive circuit has a DC/DC converter 131 which consists of a DC/AC converter 1311, a transformer 1312, and AC/DC converters 1313 to 1320 which convert dc voltage from a dc power supply 130 into floating voltages and outputs them.

The AC/DC converters 1313 to 1320 are connected through drivers 141 to 148 to the switching elements 111a to 118a. Specifically, terminals (1) to (16) in FIG. 9 are connected to terminals (1) to (16) in FIG. 8, respectively.

The floating voltages outputted from the AC/DC converters 1313 to 1320 are applied through drivers 141 to 148 across the gates and sources of the switching elements 111a to 118a, respectively.

The above described multi-level inverter, however, encounters drawbacks in that because of the switching elements 111a to 118a, are connected serially the diodes 121 to 125 are required to change the level of the output voltage, thus increasing the component parts of the inverter and the number of that require floating voltages being applied to the switching elements 111a to 118a that require floating power supplies (i.e., the AC/DC converters 1313 to 1320) which are identical in number with the switching elements 111a to 118a.

SUMMARY OF THE INVENTION

It is therefore a principal object of the present invention to avoid the disadvantages of the prior art.

It is another object of the present invention to provide an improved structure of a multi-level power converter which may be made of a decreased number of parts.

It is a still object of the present invention to decrease the number of floating power supplies of a multi-level power converter for driving switching devices.

According to one aspect of the present invention, provided a multi-level power converter which comprises a plurality of electric paths extending between dc voltage terminals and a common ac voltage output terminal, the dc voltage terminals being connected to dc power supplies and create different dc voltage levels. A plurality of switching circuits are disposed in one of the electric paths. The switching circuits are activated selectively to establish electric communication between one corresponding dc power supplies and the ac voltage output terminal to to create an ac voltage at the ac voltage output terminal. At least one of the switching circuits that is not connected to than a maximum or minimum dc terminal includes a first switching device, a second switching device that is connected in series with the first switching device, a first diode that is connected backward in parallel to the first switching device, and a second diode that is connected backward in parallel to the second switching device.

In the preferred mode of the invention, two of the switching circuits connected between one of the dc power supplies creating the maximum voltage and the ac voltage output terminal and between another of the dc power supplies creating the minimum voltage and the ac voltage output terminal each include a switching device and a diode connected backward in parallel to the switching device.

The first and second switching devices are MOS transistors which are connected at sources to each other.

The first and second switching devices may alternatively be MOS transistors which are connected at drains to each other.

The switching circuits are activated selectively under PWM control to establish the electric communication between one of the corresponding dc power supplies and the ac voltage output terminal to allow a current to flow through one of the switching circuits undergoing the PWM control. One of the switching circuits connected to one of the dc power supplies creating the dc voltage lower than that of another of the dc power supplies undergoing the PWM control is so controlled as to allow a current to flow in the same direction as that of the current flowing through the one of the switching circuits undergoing the PWM control.

According to another aspect of the invention, a multi-level power converter includes a plurality of electric paths extending between dc voltage terminals and a common ac voltage output terminal. The dc voltage terminals are connected to dc power supplies creating dc voltages at levels different from each other. A plurality of switching circuits, each disposed in one of the electric paths, are activated and inactivated selectively to establish and block electric communication between one of the corresponding dc power supplies and the ac voltage output terminal to develop an ac voltage at the ac voltage output terminal. Two of the switching circuits connected to the dc power supplies creating a maximum and a minimum voltage each include a switching device and a diode connected backward in parallel to the switching device. At least one of the switching circuits not connected to either the minimum or maximum dc voltage terminal includes a first and a second switching devices and a first and a second diode connected backward in parallel to the first and second switching devices, respectively.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 3(a) is a time chart which shows waveforms of an output voltage, an output current, and a voltage output command signal;

FIGS. 3(b) to 3(i) are time charts which show on-off timings of switching elements of the circuit in FIG. 1;

DESCRIPTION OF THE PREFERRED EMBODIMENT

Figure 1:
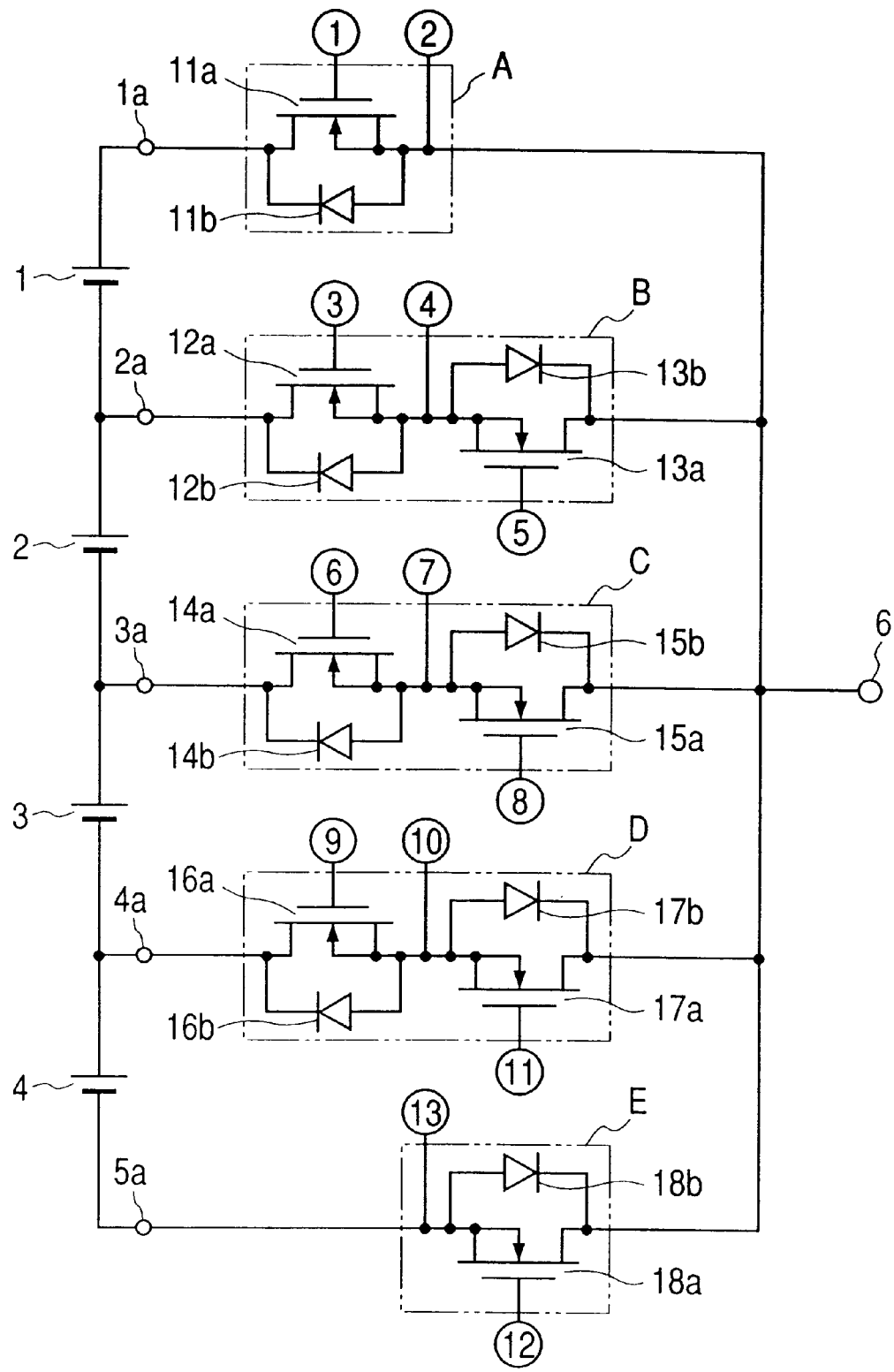
FIG. 1 is a circuit diagram which shows a circuit in one of three phases of a four-level power converter according to the invention.

Referring now to the drawings, particularly to FIG. 1, there is shown a circuit (e.g., a U-phase circuit) in one of three phases (U-phase, V-phase, and W-phase) of a four-level power converter, e.g., inverter according to the present invention.

The circuit includes dc power supplies 1 to 4 which develop 30 V at a dc voltage terminal 1a, 225 V at a dc voltage terminal 2a, 150 V at a dc voltage terminal 3a, 75 V at a dc voltage terminal 4a, and 0 V at a dc voltage terminal 5a.

Disposed between the dc voltage terminals 1a to 5a and a U-phase output terminal 6 are U-phase inverter arms which define current paths having disposed therein switching circuits A to E, respectively.

The switching circuit A disposed between the dc voltage terminal 1a at which the highest voltage appears and the output terminal 6 includes a switching device 11a and a diode 11b. The switching element 11a is made of a MOS power transistor. The diode 11b is connected backward in parallel to the switching element 11a. The backward connection means that the diode 11b is connected at an anode to a source of the switching element 11a and at a cathode to a drain thereof. The switching element E disposed between the dc voltage terminal 5a at which the lowest voltage appears and the output terminal 6 includes a switching device 18a and a diode 18b. The switching element 18a is made of a MOS power transistor. The diode 18b is connected at an anode to a source of the switching element 11a and at a cathode to a drain thereof.

The switching circuits B, C, and D disposed between the dc voltage terminals at which intermediate voltages appear and the output terminal 6 include first switching devices 12a, 14a, and 16a, second switching devices 13a, 15a, and 17a, first diodes 12b, 14b, and 16b, and second diodes 13b, 15b, and 17b, respectively. The second switching elements 13a, 15a, and 17a are connected at sources to sources of the first switching elements 12a, 14a, and 16a, respectively. The first diodes 12b, 14b, and 16b are connected backward in parallel to the first switching elements 12a, 14a, and 16a, respectively. The second diodes 13b, 15b, and 17b are connected backward in parallel to the second switching elements 13a, 15, and 17a, respectively.

Figure 2:
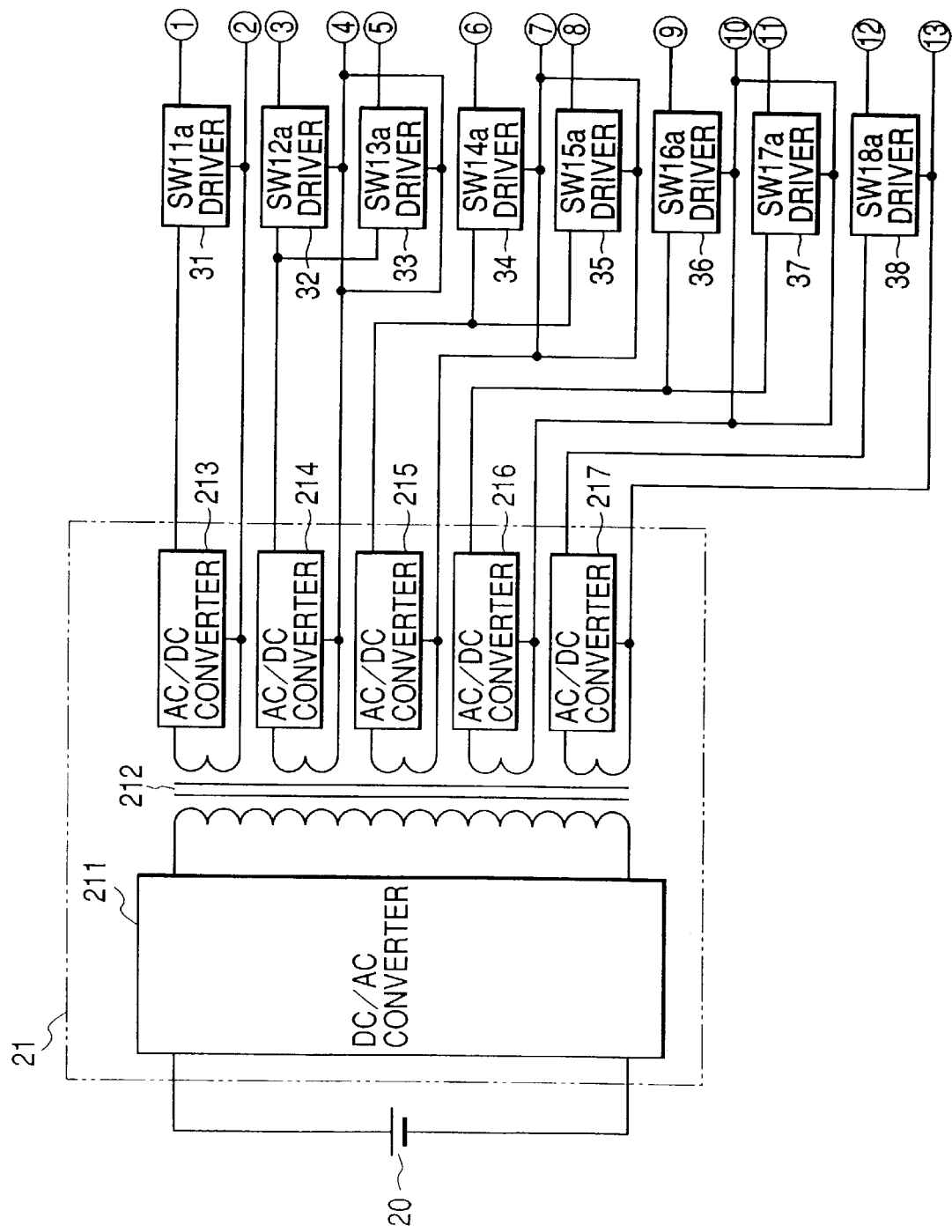
FIG. 2 is a block diagram which shows a drive circuit which applies the voltage across a gate and a source of each switching element in FIG. 1.

FIG. 2 shows a drive circuit which applies the voltage across a gate and a source of each of the switching elements 11a to 18a. The drive circuit has a DC/DC converter 21 which consists of a DC/AC converters 211, a transformer 212, and AC/DC converters 213, 214, 215, 216, and 217 and which converts the dc voltage from a dc power supply 21 into floating voltages and output them.

The AC/DC converters 213 to 217 are connected through drivers 31 to 38 to the switching elements 11a to 18a. Specifically, terminals (1) to (13) in FIG. 2 are connected to terminals (1) to (13) in FIG. 1, respectively, to apply the floating voltages outputted from the AC/DC converters 213 to 217 across the gates and sources of the switching elements 11a to 18a.

The drivers 31 to 38 receive a voltage output command signal provided by a control circuit (not shown) and turn on and off the switching elements 11a to 18a for controlling the ac voltage to be outputted from the inverter.

The operation of the drive circuit in FIG. 2 to drive the U-phase inverter arms in FIG. 1 will be discussed below with reference to FIGS. 3(a) to 5(e).

FIG. 3(a) illustrates waveforms of an output voltage, an output current, and the voltage output command signal inputted to the drivers 31 to 38. FIGS. 3(b) to 3(i) illustrate on-off timings of the switching elements 11a to 18a.

FIGS. 4(a) to 4(e) illustrate current flows through the U-phase circuit of the inverter when the dc voltages are greater than the voltage appearing at the output terminal 6 and the output current I becomes positive (I>0) and is supplied to an electric load such as a three-phase ac motor. FIGS. 5(a) to 5(e) illustrate for cases where the dc voltages are smaller than the voltage appearing at the output terminal 6 and the output current I becomes negative (I<0) so that the power is returned to the dc power supplies 1 to 4.

During an interval between t1 to t2 in FIGS. 3(a) to 3(i), the switching element 11a is subjected to PWM control. The switching element 12a is turned on. The switching element 13a is subjected to PWM control in an inverse polarity. Two of the switching elements 11a to 18a subjected to PWM control in opposition (or antiphase), e.g., the switching elements 11a and 13a are so controlled that one of them is turned on after the other is turned off for preventing both from being turned on simultaneously. The switching elements 14a and 16a are turned on, while the switching elements 15a, 17a, and 18a are turned off.

Figure 4A:
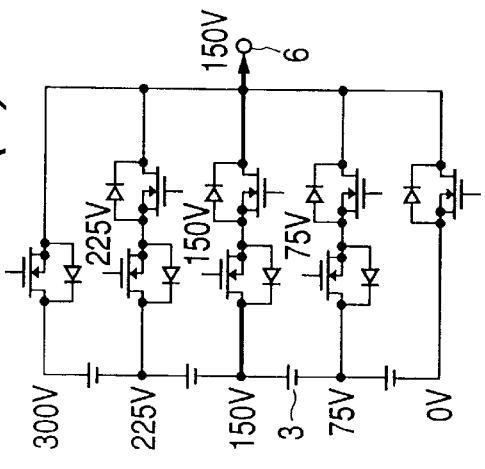
FIGS. 4(a) to 4(e) illustrate current flows from dc power supplies to an ac voltage output terminal.
Figure 4B:
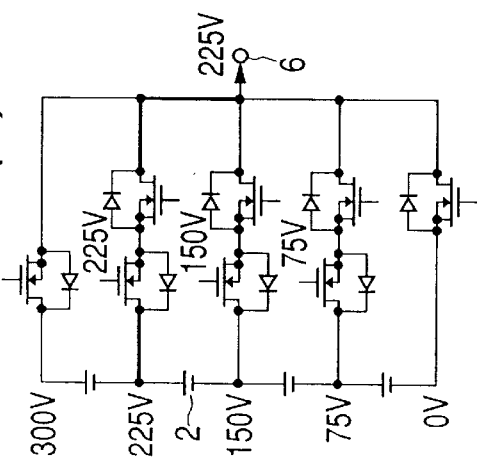

For I>0, the switching element 11a, when turned on, allows the current to flow, as shown in FIG. 4(a), from the dc power supply 1 to the output terminal 6, so that 300 V appears at the output terminal 6. Alternatively, when the switching element 11a is turned off, it will cause the current to flow, as shown in FIG. 4(b), from the dc power supply 2 to the output terminal 6 through the switching element 12a and the diode 13b, so that 225 V appears at the output terminal 6. In fact, a voltage drop is produced by the diode 13b. Therefore, PWM control of the switching element 11a causes the voltage outputted from the output terminal 6 to change as illustrated by a pulse waveform between t1 and t2 in FIG. 3(a).

Figure 5A:
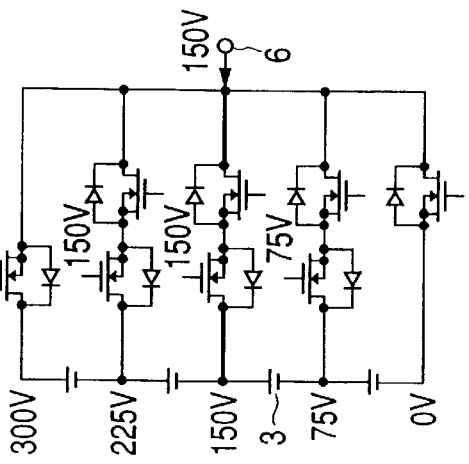
FIGS. 5(a) to 5(e) illustrate current flows from an ac voltage output terminal to dc power supplies.

For I<0, the switching element 13a, when turned off, allows the current to flow, as shown in FIG. 5(a), from the output terminal 6 to the dc power supply 1 through the switching element 11a and the diode 11b. Alternatively, when the switching element 13a is turned on, it will cause the current to flow, as shown in FIG. 5(b), from the output terminal 6 to the dc power supply 2 through the switching element 13a and the diode 12b.

During an interval between t2 and t3, the switching element 11a is turned off. The switching element 12a is subjected to PWM control. The switching elements 13a and 14a are turned on. The switching element 15a is subjected to PWM control in an inverse polarity to the switching element 12a. The switching element 16a is turned on, while the switching elements 17a and 18a are turned off.

Figure 4C:
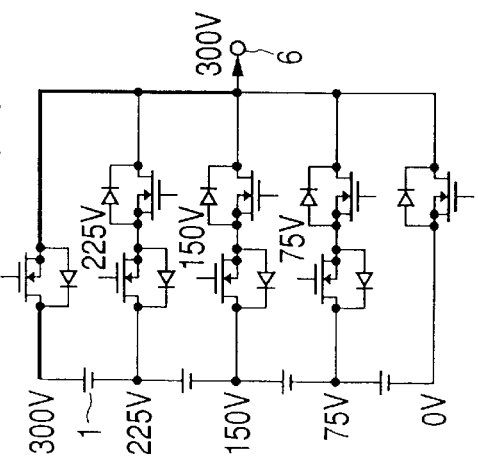

For I>0, the switching element 12a, when turned on, allows the current to flow, as shown in FIG. 4(b), from the dc power supply 2 to the output terminal 6 through the diode 13b, so that 225 V appears at the output terminal 6. Alternatively, when the switching element 12a is turned off, it will cause the current to flow, as shown in FIG. 4(c), from the dc power supply 3 to the output terminal 6 through the switching element 14a and the diode 15b, so that 150 V appears at the output terminal 6. Therefore, PWM control of the switching element 12a causes the voltage outputted from the output terminal 6 to change as illustrated by a pulse waveform between t2 and t3 in FIG. 3(a).

Figure 5B:
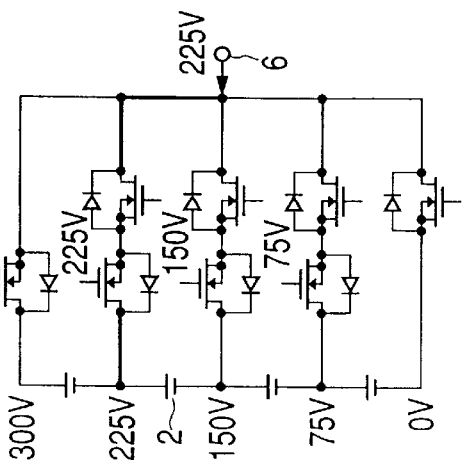

For I<0, the switching element 15a, when turned off, allows the current to flow, as shown in FIG. 5(b), from the output terminal 6 to the dc power supply 2 through the switching element 13a and the diode 12b. Alternatively, when the switching element 15a is turned on, it will cause the current to flow, as shown in FIG. 5(c), from the output terminal 6 to the dc power supply 2.

During an interval between t3 and t4, the switching elements 11a and 12a are turned off, while the switching element 13a is turned on. The switching element 14a is subjected to PWM control. The switching elements 15a and 16a are turned on. The switching element 17a is subjected to PWM control in an inverse polarity to the switching element 14a. The switching element 18a is turned off.

Figure 4D:
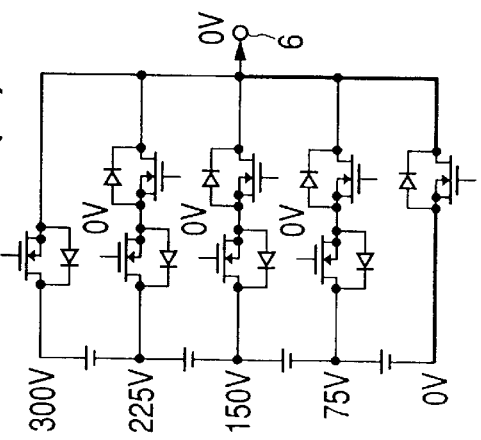

For I>0, the switching element 14a, when turned on, allows the current to flow, as shown in FIG. 4(c), from the dc power supply 3 to the output terminal 6 through the diode 15b, so that 150 V appears at the output terminal 6. Alternatively, when the switching element 14a is turned off, it will cause the current to flow, as shown in FIG. 4(d), from the dc power supply 4 to the output terminal 6 through the switching element 16a and the diode 17b, so that 75 V appears at the output terminal 6. Therefore, PWM control of the switching element 14a causes the voltage outputted from the output terminal 6 to change as illustrated by a pulse waveform between t3 and t4 in FIG. 3(a).

Figure 5C:
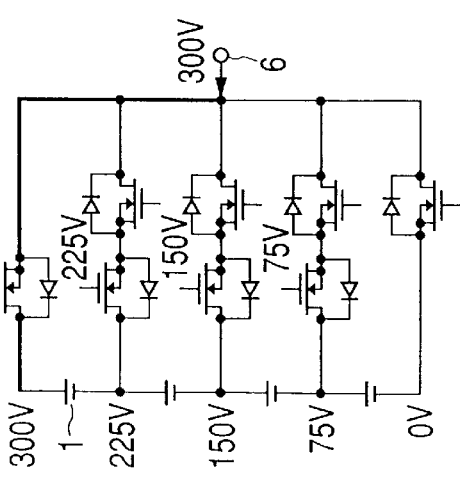

For I<0, the switching element 17a, when turned off, allows the current to flow, as shown in FIG. 5(c), from the output terminal 6 to the dc power supply 2 through the switching element 15a and the diode 14b. Alternatively, when the switching element 17a is turned on, it will cause the current to flow, as shown in FIG. 5(d), from the output terminal 6 to the dc power supply 2 through the switching element 17a and the diode 16b.

During an interval between t4 and t5, the switching elements 11a, 12a, and 14a are turned off, while the switching elements 13a and 15a are turned on. The switching element 16a is subjected to PWM control. The switching element 17a are turned on. The switching element 18a is subjected to PWM control in an inverse polarity to the switching element 16a.

Figure 4E:
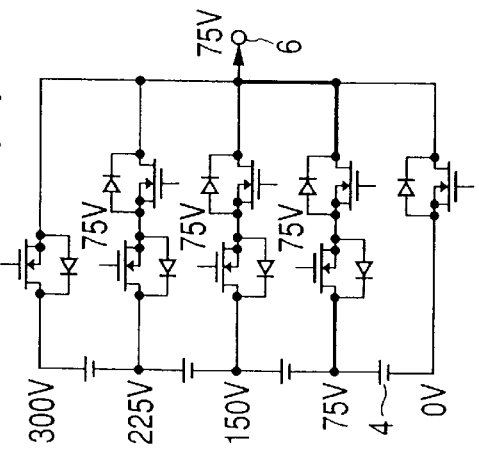

For I>0, the switching element 16a, when turned on, allows the current to flow, as shown in FIG. 4(d), from the dc power supply 4 to the output terminal 6 through the diode 17b, so that 75 V appears at the output terminal 6. Alternatively, when the switching element 16a is turned off, it will cause 0 V to appear, as shown in FIG. 4(e), at the output terminal 6 because the switching element 18a is turned on. Therefore, PWM control of the switching element 16a causes the voltage outputted from the output terminal 6 to change as illustrated by a pulse waveform between t4 and t5 in FIG. 3(a).

Figure 5D:
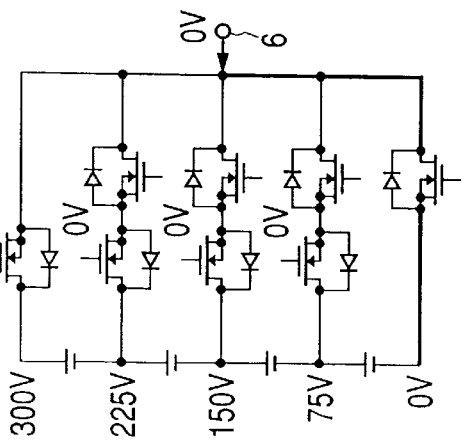
Figure 5E:
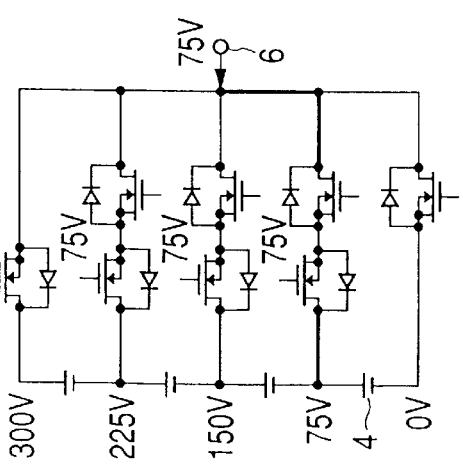

For I<0, the switching element 18a, when turned off, allows the current to flow, as shown in FIG. 5(d), from the output terminal 6 to the dc power supply 4 through the switching element 17a and the diode 16b. Alternatively, when switching element 18a is turned on, it will cause the current to flow, as shown in FIG. 5(e), from the output terminal 6 to the negative terminal of the dc power supply 4 through the switching element 18a.

During an interval between t5 and t6, the switching elements 11a to 18a are controlled in the same manner as that during the interval between t3 and t4. During an interval between t6 and t7, the switching elements 11a to 18a are controlled in the same manner as that during the interval between t2 and t3.

In the above described manner, the U-phase inverter arms are driven in each cycle.

The V- and W-phase circuits of the four-level inverter of this embodiment each have the same structure as that of the above described U-phase circuit and connect with the dc power supplies 1 to 4 as used in the U-phase circuit. With these arrangements, a three-phase ac voltage is provided by the U-, V-, and W-phase circuits to drive the electric load.

As can be seen from FIGS. 3(b) and 3(c), during the interval between t1 and t2 in which the switching element 11a is subjected to PWM control, the switching element 12a on a lower voltage side is kept turned on, thereby causing the current to flow through the switching element 12a and the diode 13b when the switching element 11a is turned off for I>0. This allows the voltage developed at the output terminal 6 to be changed to 225 V without high surge voltage.

Similarly, during the intervals between t2 and t3 and between t6 and t7 in which the switching element 12a is subjected to PWM control, the switching element 14a on a lower voltage side is kept turned on, thereby causing the current to flow through the switching element 14a and the diode 15b when the switching element 12a is turned off for I>0. This allows the voltage developed at the output terminal 6 to be changed to 150 V without high surge voltage.

Further, during the intervals between t3 and t4 and between t5 and t6 in which the switching element 14a is subjected to PWM control, the switching element 16a on a lower voltage side is, similar to the above, kept turned on, thereby causing the current to flow through the switching element 16a and the diode 17b when the switching element 14a is turned off for I>0. This allows the voltage developed at the output terminal 6 to be changed to 75 V without high surge voltage.

During the interval between t4 and t5, when the switching element 16a is turned off, the voltage developed at the output terminal 6 is switched to 0 V.

Specifically, when one of the switching elements 11a to 18a on a higher voltage side is subjected to PWM control, another switching element on a lower voltage side is so set as to allow the current to flow therethrough in the same direction as that flowing through the one of the switching elements 11a to 18a undergoing PWM control, thereby avoiding a short circuit of the electric load and ensuring the current flow at all the time. This eliminates the need for an interphase capacitor as used in conventional inverters.

Figure 9:
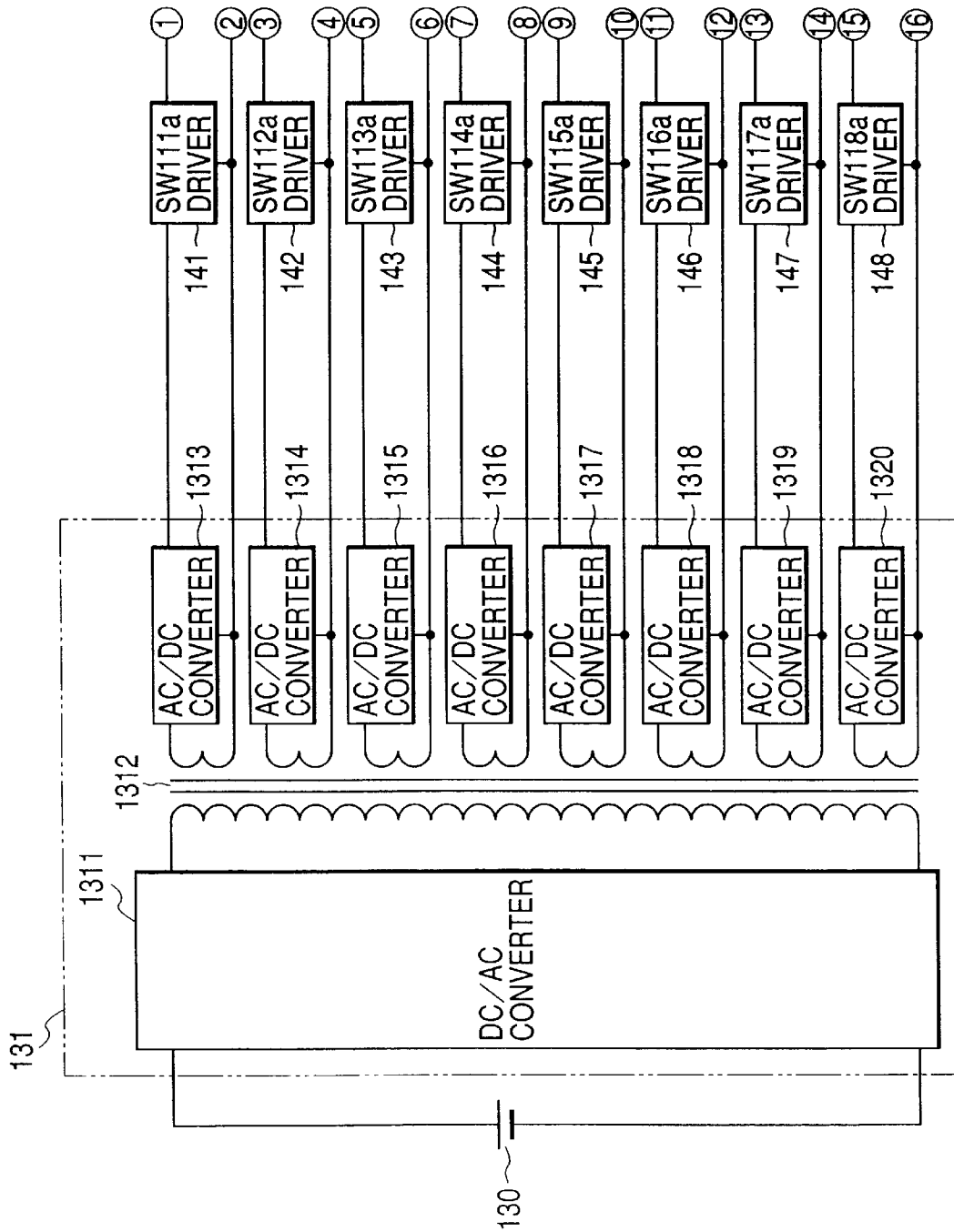
FIG. 9 is a block diagram which shows a drive circuit for the multi-level inverter in FIG. 8.

In this embodiment, each of the switching circuits B, C, and D has the two switching elements connected in series at sources thereof, thereby allowing these switching elements to be driven by a single floating power supply. This results in a decrease in floating power supply as compared between FIG. 2 and FIG. 9.

Figure 8:
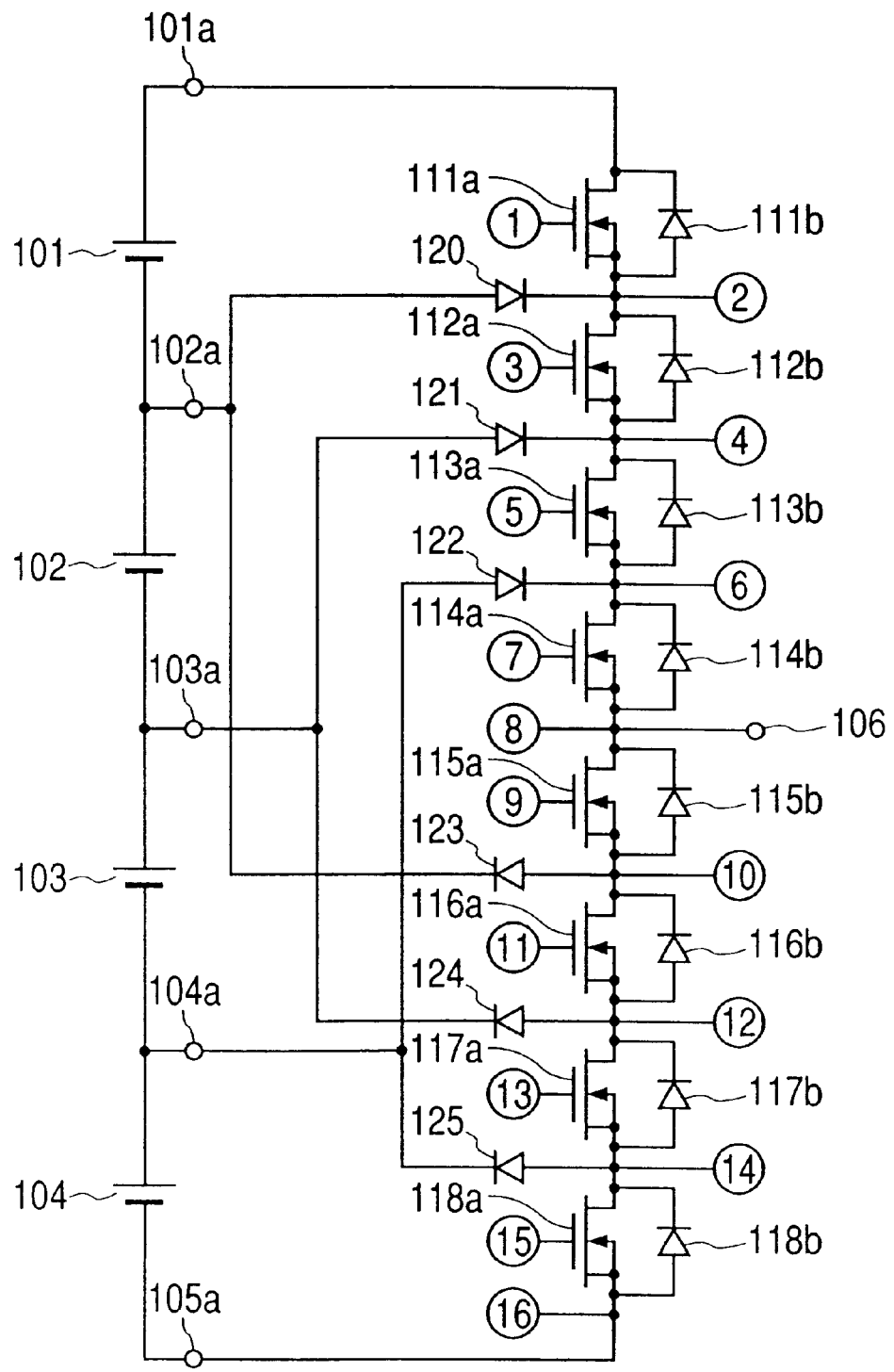
FIG. 8 is a circuit diagram which shows a circuit in one of three phases of a conventional multi-level inverter.

While in the conventional structure shown in FIG. 8, a decrease in withstand voltage to reduce on-resistance of one of the switching elements may be achieved by increasing the switching elements connected in series, the use of IGBTs or SiC transistors as the switching elements causes the reduction in on-resistance to be lowered. Therefore, when such elements are used, it is advisable that the number of switching elements connected in series be decreased even if the withstand voltage thereof is great. The power converter of this embodiment has the two switching elements connected in series and is suitable for providing a multi-level voltage using IGBTs or SiC transistors.

In the power converter of this embodiment, even when the switching element is turned on, the current flows through the diode connected backward in parallel thereto, but may be controlled to flow only through the switching element that is turned on or through both the switching element and the diode.

Figure 6:
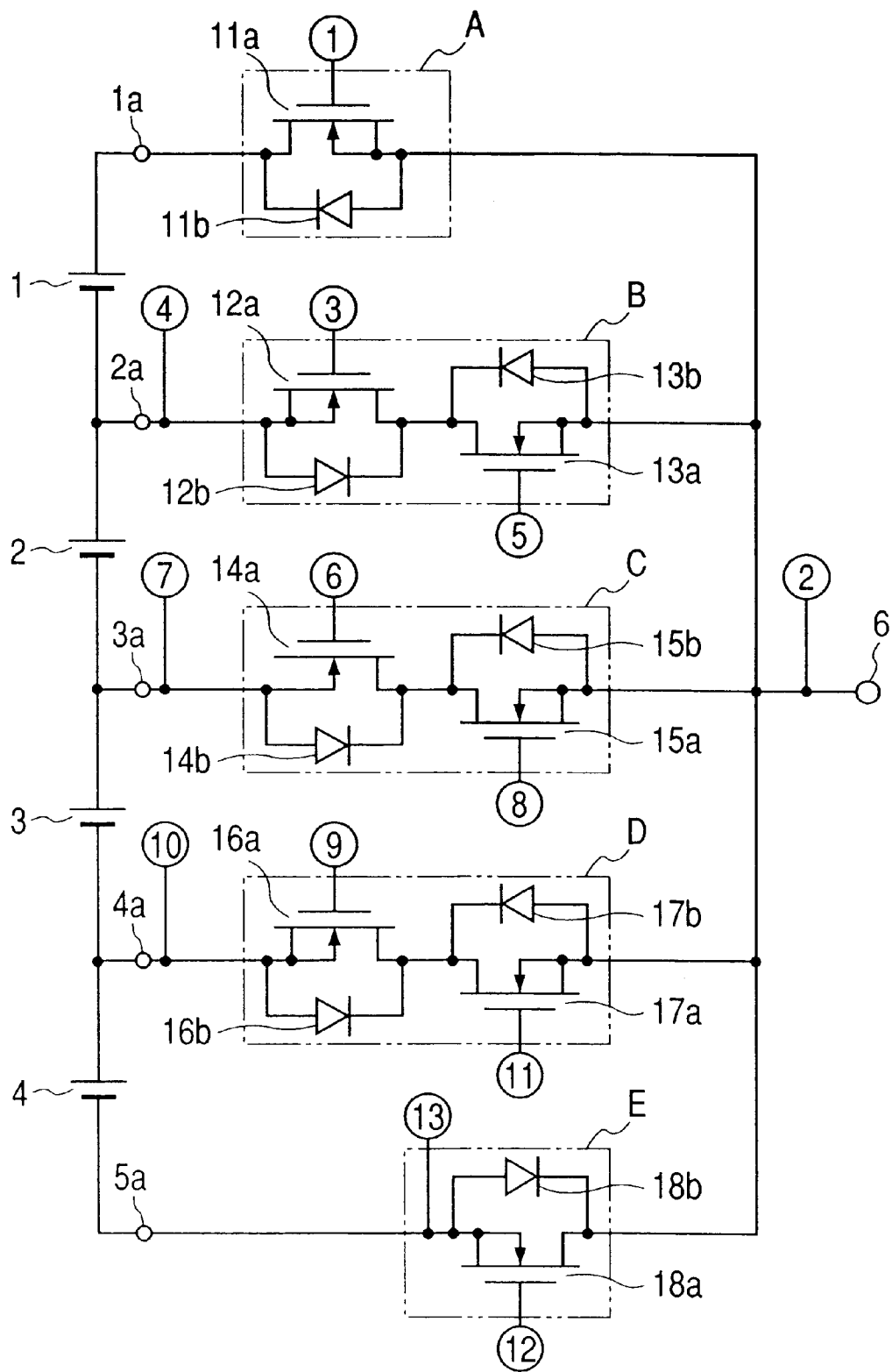
FIG. 6 is a circuit diagram which shows a circuit in one of three phases of a four-level power converter according to the second embodiment of the invention.
Figure 7:
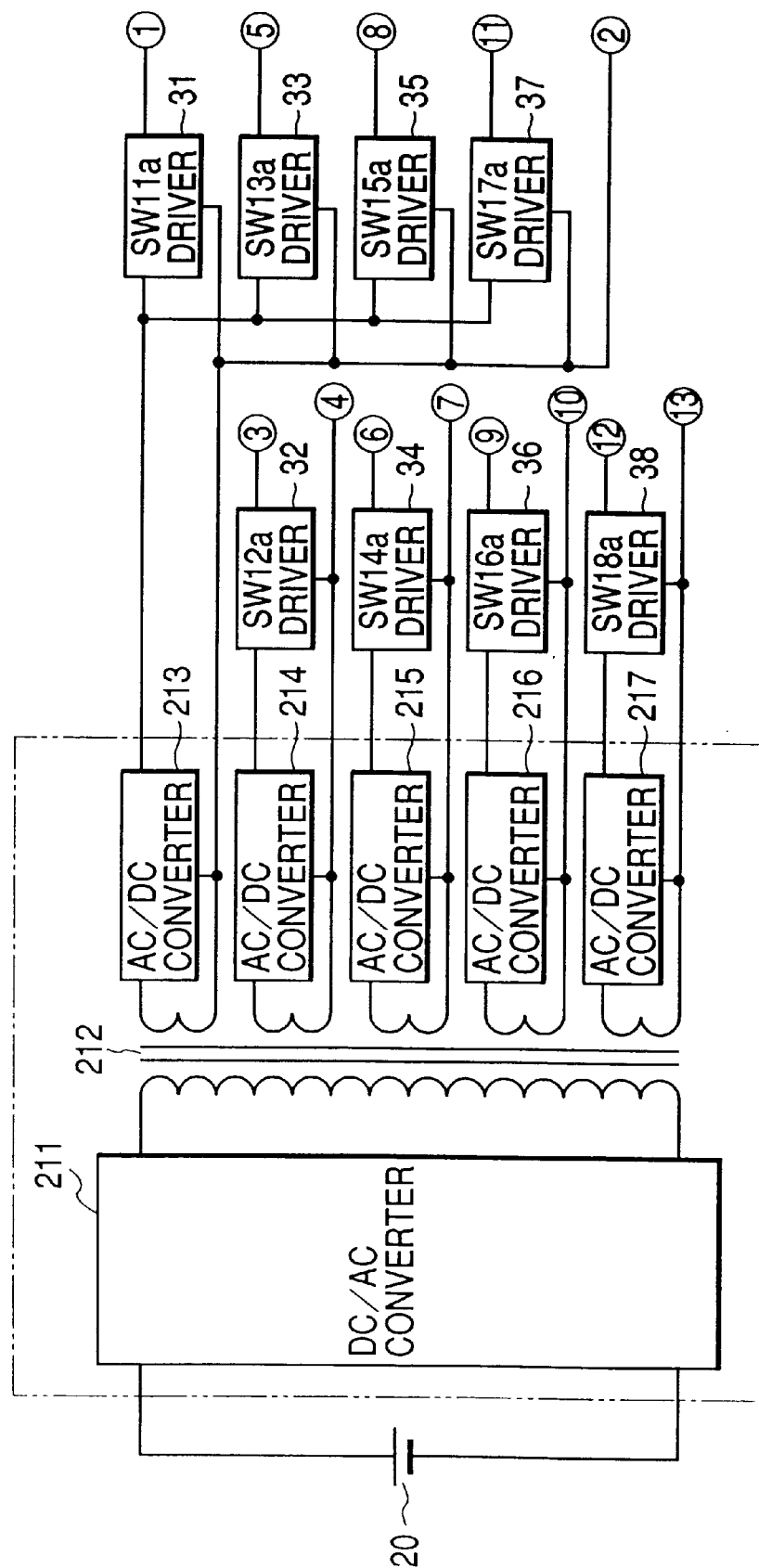
FIG. 7 is a block diagram which shows a drive circuit for the power converter in FIG. 6.

The switching elements 12a, 14a, and 16a are connected at sources thereof to sources of the switching elements 13a, 15a, and 17a, but may be connected, as shown in FIG. 6, at drains thereof to drains of the switching elements 13a, 15a and 17a, respectively. In this case, the switching elements 11a, 13a, 15a, and 17a are connected at sources thereof to each other, so that they can be driven, as shown in FIG. 7, by a single floating power supply (i.e., the AC/DC converter 213). Note that symbols (1) to (13) in FIG. 7 illustrate connections with symbols (1) to (13) in FIG. 1.

The switching elements 12a, 14a, 16a, and 18a have the sources thereof connected to the dc power supply terminals 1a to 5a, thereby allowing the same floating power supplies as used in the U-phase circuit to be used in driving corresponding switching elements of each of the V- and W-phase circuits. Specifically, the voltages outputted from the AC/DC converters 214 to 217 may be employed in each of the U-, V-, and W-phase circuits.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A multilevel power converter comprising:
   a plurality of electric paths extending between dc voltage terminals and a common ac voltage output terminal, the dc voltage terminals being connected to dc power supplies creating dc voltages at levels different from each other; and
   a plurality of switching circuits each disposed in one of said electric paths, said switching circuits being activated selectively to establish electric communication between corresponding one of the dc power supplies and the ac voltage output terminal to develop an ac voltage output terminal, wherein at least one of said switching circuits is connected to the dc voltage terminal having other than a minimum or a maximum voltage includes a first switching device, a second switching device connected in series with the first switching device, and a second diode connected backward in parallel to the second switching device.

2. A multi-level power converter as set forth in claim 1, wherein two of said switching circuits connected between one of the dc power supplies creating the maximum voltage and the ac voltage output terminal and between another of the dc power supplies creating the minimum voltage and the ac voltage output terminal each include a switching device and a diode connected backward in parallel to the switching device.

3. A multi-level power converter as set forth in claim 1, wherein the first and second switching devices are MOS transistors which are connected at sources to each other.

4. A multi-level power converter as set forth in claim 1, wherein the first and second switching devices are MOS transistors which are connected at drains to each other.

5. A multi-level power converter as set forth in claim 1, wherein said switching circuits are activated selectively under PWM control to establish the electric communication between corresponding one of the dc power supplies and the ac voltage output terminal to allow a current to flow through one of said switching circuits undergoing the PWM control, and wherein one of said switching circuits connected to one of the dc power supplies creating the dc voltage lower than that of another of the dc power supplies undergoing the PWM control is so controlled as to allow a current to flow in the same direction as that of the current flowing through the one of said switching circuits undergoing the PWM control.

6. A multilevel power converter comprising:
   a plurality of electric paths extending between dc voltage terminals and a common ac voltage output terminal, the dc voltage terminals being connected to dc power supplies creating dc voltages at level different from each other; and
   a plurality of switching circuits each disposed in one of said electric paths, said switching circuits being activated and inactivated selectively to establish and block electric communication between corresponding one of the dc power supplies and the ac voltage output terminal to develop an ac voltage at the ac voltage output terminal,
   wherein two of said switching circuits connected to the dc power supplies creating a maximum and minimum voltage each include a switching device, and
   wherein at least one of said switching circuits is connected to the dc voltage terminal having other than a minimum or a maximum voltage includes a first and a second switching devices and a first and a second diode connected backward in parallel to the first and the second switching devices, respectively.

* * * * *